United States Patent Office 3,211,768
Patented Oct. 12, 1965

3,211,768
CHEMICAL PROCESS FOR PREPARING A SALT OF A METAL OF GROUPS (IV)A AND (V)A AND SALT
William J. Considine, Flushing, N.Y., assignor, by mesne assignments, to M&T Chemicals Inc., New York, N.Y., a corporation of Delaware
No Drawing. Filed Jan. 18, 1961, Ser. No. 83,378
22 Claims. (Cl. 260—414)

This invention relates to a process for manufacturing organic salts of metals of Groups IVA and VA of the Periodic Table. More specifically, it relates to a novel process for producing metal soaps.

As is well known to those skilled in the art, soaps are commonly made by combining a metal with a radical of a long chain fatty acid—typically one having 16–18 carbon atoms in the chain. Soaps of a large number of metals have been prepared by a process wherein a water-soluble salt of the metal is reacted with the sodium salt of the appropriate acid under conditions sufficient to promote exchange of the sodium with the other metal to produce the desired soap.

In another commonly employed process, a mixture of the appropriate fatty acid(s) and a reactive basic derivative of the metal may be reacted. For example, antimony trioleate may be prepared by reacting antimony trichloride with sodium oleate. However, this procedure is disadvantageous because the antimony trichloride is very hygroscopic even under the most favorable conditions; in the presence of water or slight traces of moisture (even from the atmosphere) the yield of the product is low. Furthermore the raw materials, typically antimony trichloride, are expensive and difficult to handle.

Attempts have been made to react metal oxide, e.g. antimony oxide, with acids, e.g. oleic acid, to produce antimony trioleate. However, this reaction is undesirably characterized by the use of high temperature (e.g. 170° C. or more) for extended periods of time (e.g. several hours), by incomplete reaction, by low yields, by impure product containing excess unreacted fatty acid, etc. which make it commercially impractical.

Attempts have also been made to prepare metal salts by reacting a metal oxide with a carboxylic acid anhydride. Although it may be possible to use this procedure for lower anhydrides including acetic anhydride, propionic anhydride, and butyric anhydride, it has not been found to be practicable to prepare salts of higher acids, typically the oleates, from the anhydrides of the corresponding higher acids.

It is an object of this invention to set forth a novel process for preparing metal soaps. It is a more specific object of this invention to provide a process for preparing soaps of metals of Groups IVA–VA of the Periodic Table. Other objects of this invention will be apparent to those skilled in the art upon inspection of the following description.

In accordance with certain aspects of this invention, a salt of metal of Groups IVA and VA of the Periodic Table may be prepared by reacting an oxide of said metal with a mixed carboxylic acid anhydride having a lighter hydrocarbon radical R and a heavier hydrocarbon radical R' thereby forming a metal salt containing the said heavier hydrocarbon radical and a byproduct containing said lighter hydrocarbon radical, and separating said salt from said by-product.

In practice of this invention, a metal oxide is reacted with a mixed acid anhydride in accordance with the following equation:

(1) $M_2O_a + 2aR'COOCOR \rightarrow 2M(COOR')_a + a(RCO)_2O$

In Equation 1 supra, M may be a metal of Groups IVA–VA of the Periodic Table. Those metals in Group IVA which may fall within the scope of this invention include germanium, tin, and lead. Those metals of Group VA of the Periodic Table which may be employed include arsenic, antimony, and bismuth.

It is preferred that the metal M be in its lower state of valence in the oxide $M_2O_a$. In the formula $M_2O_a$ (wherein O represents oxygen) $a$ may be either 2 or 3 in the preferred embodiment of this invention. When M is a metal selected from Group VA, $a$ may be 3, and the formula $M_2O_a$ may become $M_2O_3$ generally, e.g. $As_2O_3$, $Sb_2O_3$, or $Bi_2O_3$; when the metal M is a metal of Groups IVA, $a$ may be equal to 2, and the formula in this case may be indicated as $M_2O_2$. In this latter diminutive case, the formula may more properly be written MO; and $M_2O_2$ may be taken to mean 2 moles of MO, typically GeO, SnO, or PbO.

When the metal M is a Group IVA metal, Equation 1 becomes, in the preferred embodiment:

(2) $MO + 2R'COOCOR \rightarrow M(COOR')_2 + (RCO)_2O$

When the metal M is a group VA metal, Equation 1 becomes:

(3) $M_2O_3 + 6R'COOCOR \rightarrow 2M(COOR')_3 + 3(RCO)_2O$

Both R and R' may be hydrocarbon radicals including hydrocarbon radicals having substituents which are non-reactive with the other components of the system. Typical of such inert or non-reactive substituents may be inert halide groups, either groups typified by the phenoxy group, etc. Although either R or R' may be heterocyclic, aromatic, or aliphatic, e.g. aryl, aralkyl, alkyl, etc. in the preferred embodiment of this invention R and R' may be aliphatic and preferably alkyl radicals.

The relationship between R' and R is such that the acid R'COOH is less volatile than the acid RCOOH, or equivalently that the anhydride $(R'CO)_2O$ is less volatile than the anhydride $(RCO)_2O$, and preferably sufficiently less volatile so that in the reaction hereinafter described in greater detail, a by-product acid (orits anhydride) containing R is sufficiently volatile to be removed from the reaction liquor by distillation. It is a feature of the mixed anhydride that preferably R' be heavier than R, i.e. that R' have a greater molecular weight than does R.

In the preferred embodiments of this invention, the heavier hydrocarbon radical R' may contain more than about 7 carbon atoms and less than about 22 carbon atoms. Typical hydrocarbon radicals which are representative of those which may be R' include the following (there being also noted in this table the corresponding acid formed from this radical by the addition thereto of a carboxyl group):

TABLE I

| R': | Corresponding acid |
|---|---|
| n-heptadecyl | stearic acid. |
| n-undecyl | lauric acid. |
| n-octyl | pelargonic acid. |
| 1-ethylamyl | isooctoic acid. |
| α-naphthyl | α-naphthoic acid. |
| n-heptadecenyl-8 | oleic acid. |
| p-chlorophenyl | p-chlorobenzoic acid. |
| phenoxymethyl | phenoxyacetic acid. |
| cyclohexyl | cyclohexyl carboxylic acid (naphthenic acid). |
| commercial tetrachlorophenyl | commercial tetrachlorobenzoic acid [1]. |

TABLE I—Continued

| | |
|---|---|
| p-methoxyphenyl | p-methoxybenzoic acid. |
| m-bromophenyl | m-bromobenzoic acid. |

[1] A commercially available mixture of acids including isomers of the several tetrachlorobenzoic acids.

Other radicals which may be used in practice of this invention may include those listed in the first column below, the second column listing the corresponding acid:

| | |
|---|---|
| 3-pyridyl | isonicotinic acid. |
| α-furoyl | furoic acid. |

R' may be other hydrocarbon radicals, saturated or unsaturated, unsubstituted or inertly substituted, including such radicals as the tallyl, i.e. the radical derived from the commercial material known as tall oil fatty acids which may be a mixture of higher molecular weight saturated and unsaturated fatty acids. Other commercial-grade fatty acid mixtures may be employed.

In the preferred embodiment of this invention, the lighter hydrocarbon radical R contains less than about 4 carbon atoms and includes such radicals as methyl, ethyl, propyl, isopropyl, etc. In the preferred embodiment, the group is methyl.

It will be apparent to those skilled in the art that subject to the above requirements, the particular make-up of the mixed carboxylic acid anhydride, and more specifically the composition of the radicals R and R', will vary depending upon the particular product to be prepared. Typical preferred mixed acid anhydrides which may be employed may be those containing the R and R' radicals noted in the following table:

TABLE II

| R' | R |
|---|---|
| Cyclohexyl | Ethyl |
| n-Heptadecyl | Methyl |
| 1-ethylamyl | Methyl |
| Tetrachlorophenyl | Methyl |
| n-Octyl | Methyl |
| n-Undecyl | Methyl |
| "Tallyl" | Ethyl |
| Phenoxymethyl | n-Propyl |
| Furoyl | Methyl |
| m-Bromophenyl | Ethyl |
| Phenoxymethyl | Methyl |

The mixed carboxyclic acid anhydrides of this invention may be prepared by a variety of processes. They may be prepared by reacting an anhydride $(RCO)_2O$, e.g., acetic anhydride, with an acid R'COOH, e.g. stearic acid, and distilling from the reaction mixture the by-product acid RCOOH, e.g. acetic acid.

When R is methyl, a ketene may be reacted with the acid R'COOH to form the fixed anhydride $$R'COOCOCH_3$$

It is a feature of this invention that the mixed carboxylic acid anhydride may be formed either prior to the reaction with the metal oxide; or in situ (i.e. in the presence of the metal oxide) during the practice of the reaction of this invention from a carboxylic acid anhydride (or a ketene) and an acid. Preferably the carboxylic acid anhydride which may be employed is one which is economically priced and readily available. Commonly the carboxylic acid anhydride which may be employed to form the mixed carboxylic acid anhydride in situ will be $(RCO)_2O$. Although it may be possible to employ the acid anhydride of butyric acid, propionic acid, etc., the preferred caboxylic acid anhydride is acetic anhydride.

When the mixed carboxylic acid anhydride is to be formed in situ from a carboxylic acid anhydride and an acid, the equations corresponding to (1), (2), and (3) are as follows:

(4) $M_2O_a + 2aR'COOH + a(RCO)_2O$
$\rightarrow 2M(COOR')_a + 2aRCOOH$ (5) $MO + 2R'COOH + 2(RCO)_2O$
$\rightarrow M(COOR')_2 + 2RCOOH$ (6) $M_2O_3 + 6R'COOH + 3(RCO)_2O$
$\rightarrow 2M(COOR')_3 + 6RCOOH$ When the mixed anhydride is formed in situ from a ketene and an acid, the appropriate equations may be as follows:

(7) $M_2O_a + 2aR'COOH + 2aR''\text{---}CH=C=O$
$\rightarrow 2M(COOR')_a + a(R''CH_2CO)_2O$ (8) $MO + 2R'COOH + 2R''\text{---}CH=C=O$
$\rightarrow M(COOR')_2 + 2(R''CH_2CO)_2O$ (9) $M_2O_3 + 6R'COOH + 6R''\text{---}CH=C=O$
$\rightarrow 2M(COOR')_3 + 3(R''CH_2CO)_2O$ In Equations 7, 8, and 9, R" may be R or hydrogen; all other symbols are the same as before.

It will be noted that when the mixed carboxylic acid anhydride is employed, the by-product formed, in addition to the desired product, is a carboxylic acid anhydride containing the lighter hydrocarbon radical R. If the mixed carboxylic acid anhydride employed be formed in situ from a ketene, then the by-product is the carboxylic acid anhydride. When the mixed carboxylic acid anhydride is formed in situ by reaction of acid and anhydride, the by-product formed is the acid containing the shorter chain R.

In carrying out the process of this invention, the mixed carboxylic acid anhydride is placed in the reaction vessel together with preferably the stoichiometric quantity of the oxide of the metal of Groups IVA and VA. Where the reaction is to be effected using the mixed carboxylic acid anhydride formed in situ, the stoichiometric amonuts of the acid, the anhydride, and the metal oxide according to the appropriate equation supra may be placed directly in the reaction vessel.

Preferably the reaction mixture is heated to its reflux temperature, typically about 110° C. to about 200° C., say about 120° C. Typically during the course of a reaction, the vapor temperature may start at a high level corresponding approximately to the boiling point of the carboxylic acid anhydride and fall to a level corresponding approximately to the boiling point of the acid. The mixture may be agitated during the course of the reaction which may continue for 30 minutes to 240 minutes, say 60 minutes. During this period, the desired product metal salt is formed.

At the conclusion of the reflux operation, the by-product acid or anhydride is distilled off preferably at subatmospheric pressure with good agitation.

It is a particular feature of this invention that the distillation can be conducted at temperatures sufficiently low to minimize the possible decomposition of the product; and it is readily possible to recover the by-product acid or anhydride in pure form.

Work-up of the product may include clarification by passage through a bed of diatomaceous earth or equivalent which removes any unreacted metal oxide. Where the product is a solid or a viscous liquid, it may be dissolved in suitable solvent, e.g. benzene, before clarification—the solvent being subsequently recovered.

Specific examples of compounds which may be prepared in accordance with this invention include: antimony tristearate, antimony trilaurate, antimony tripelargonate, antimony tris-2-ethylhexoate, antimony trioleate, antimony triphenoxyacetate, antimony trinaphthenate, antimony tritetrachlorobenzoate, etc., bismuth tristearate, bismuth trilaurate, bismuth tripelargonate, bismuth tris-2-ethylhexoate, bismuth trioleate, bismuth triphenoxyacetate, bismuth trinaphthenate, bismuth tritetrachlorobenzoate, etc., arsenic tristearate, arsenic trilaurate, arsenic tripolargonate, arsenic tris-2-ethylhexoate, arsenic trioleate, arsenic triphenoxyacetate, arsenic trinaphthenate, arsenic tritetrachlorobenzoate, etc., stannous stearate, stannous laurate, stannous pelargonate, stannous 2-ethylhexoate, stannous oleate, stannous phenoxyacetate, stannous naphthenate, stannous tetrachlorobenzoate, etc., plumbous stearate, plumbous laurate, plumbous pelargonate, plumbous 2-ethylhexoate, plumbous oleate, plumbous phenoxyacetate, plumbous naphthenate, plumbous tetrachlorobenzoate, etc., germanium distearate, germanium dilaurate, germanium dipelargonate, germanium di-2-ethylhexoate, germanium dioleate, germanium diphenoxyacetate, germanium dinaphthenate, germanium ditetrachlorobenzoate, etc.

Practice of the invention may be illustrated by the following examples wherein all parts are given on a weight basis.

*Example 1.—Antimony tripelargonate*

1001 parts of acetic pelargonic anhydride may be prepared by refluxing acetic anhydride, 510 parts, and pelargonic acid, 791 parts, and distilling off 300 parts of acetic acid as it is formed. The 1001 parts of acetic pelargonic anhydride so prepared and 242 parts of the metal oxide, antimony trioxide, may be added to a reaction vessel fitted with agitation and a reflux condenser. The reaction mixture may be heated to reflux temperature at which it is maintained for 120 minutes. The reaction mixture may then be subjected to a pressure of 10 to 20 mm. Hg and the by-product acetic anhydride may be recovered by distilling for 30 minutes to a pot temperature of 150° C.

At the end of the distillation, the solid residue found on cooling may be dissolved in 1000 parts of benzene and passed through a bed of diatomaceous earth to prepare a bright, sparkling solution. The benzene may be recovered by distillation to give a solid product, 974 parts (representing a 98% yield) with an antimony content of 19.8%. Theoretical content of antimony is 20.5%.

*Example 2.—Antimony tripelargonate*

Antimony trioxide may be reacted with the mixed carboxylic acid anhydride, acetic pelargonic anhydride, formed in situ by adding 1545 parts of antimony trioxide, 1612 parts of acetic anhydride, and 5000 parts of pelargonic acid to a reaction vessel fitted with agitation and a reflux condenser. The reaction mixture may be heated to reflux temperature at which it may be maintained for 60 minutes.

The reaction mixture may then be subjected to a pressure of 10 to 20 mm. Hg and the by-product acetic acid may be recovered by distilling to a pot temperature of 100° C. for 30 minutes and then raising the temperature to 150° C. for 15 minutes.

At the end of the distillation, the solid residue found on cooling may be dissolved in 5000 parts of benzene and passed through a bed of diatomaceous earth to prepare a bright, sparkling solution. The benzene may be recovered by distillation to give a solid product, 5830 parts (representing a 94% yield) with an antimony content of 20.4%. Theoretical content of antimony is 20.5%.

*Example 3.—Arsenic tripelargonate*

Arsenic trioxide may be reacted with the mixed carboxylic acid anhydride, acetic pelargonic anhydride, formed in situ by adding 989 parts of arsenic trioxide, 153 parts of acetic anhydride, and 474 parts of pelargonic acid to a reaction vessel fitted with agitation and a reflux condenser. The reaction mixture may be heated to reflux temperature at which it may be maintained for 60 minutes.

The reaction mixture may then be subjected to a pressure of 10 to 20 mm. Hg and the by-product acetic acid may be recovered by distilling for 30 minutes to a pot temperature of 140° C.

At the end of the distillation, the solid residue found on cooling may be dissolved in 500 parts of benzene and passed through a bed of diatomaceous earth to prepare a bright, sparkling solution. The benzene may be recovered by distillation to give a solid product, 543 parts (representing a 99% yield) with an arsenic content of 13.6%. Theoretical content of arsenic is 13.7%.

*Example 4.—Bismuth tris-2-ethylhexoate*

Bismuth trioxide may be reacted with acetic 2-ethylhexoic acid anhydride formed in situ by adding 233 parts of bismuth trioxide, 153 parts of acetic anhydride, and 432 parts of 2-ethylhexoic acid to a reaction vessel fitted with agitation and a reflux condenser. The reaction mixture may be heated to reflux temperature at which it may be maintained for 120 minutes. The reaction mixture may then be subjected to a pressure of 2 mm. Hg and the by-product acetic acid may be recovered by distilling to a pot temperature of 100° C.

At the end of the distillation, the solid residue found on cooling may be dissolved in 600 parts of benzene and passed through a bed of diatomaceous earth to prepare a bright, sparkling solution. The benzene may be recovered by distillation to give a solid product, 580 parts (representing a 95% yield) with a bismuth content of 31.8%. Theoretical content of bismuth is 32.8%.

*Example 5.—Bismuth trioleate*

Bismuth trioxide may be reacted with acetic oleic anhydride formed in situ by adding 233 parts of bismuth trioxide, 153 parts of acetic anhydride, and 897 parts of U.S.P. oleic acid to a reaction vessel fitted with agitation and a reflux condenser. The reaction mixture may be heated to reflux temperature at which it may be maintained for 120 minutes.

The reaction mixture may then be subjected to a pressure of 0.05 mm. Hg and the by-product acetic acid may be recovered by distilling to a pot temperature of 70° C.

At the end of the distillation, the solid residue found on cooling may be dissolved in 1500 parts of benzene and passed through a bed of diatomaceous earth to prepare a bright, sparkling solution. The benzene may be recovered by distillation to give a solid product 104 parts (representing a 98% yield) with a bismuth content of 18.8%. Theoretical content of bismuth is 19.8%.

*Example 6.—Antimony tris-cyclohexane carboxylate*

Antimony trioxide may be reacted with propionic, cyclohexanecarboxylic anhydride formed in situ by adding 728 parts of antimony trioxide, 976 parts of propionic anhydride, and 1923 parts of cyclohexanecarboxylic acid to a reaction vessel fitted with agitation and a reflux condenser. The reaction mixture may be heated to reflux temperature at which it may be maintained for 120 minutes.

The reaction mixture may then be subjected to a pressure of 10 to 20 mm. Hg and the by-product propionic acid may be recovered by distilling for 30 minutes to a pot temperature of 75° C. and then raising the temperature to 150° C. for 30 minutes.

At the end of the distillation, the solid residue found on cooling may be dissolved in 2500 parts of benzene and passed through a bed of diatomaceous earth to prepare a bright, sparkling solution. The benzene may be recovered by distillation to give a solid product, 2370 parts (representing a 95% yield) with an antimony content of 24.2%. Theoretical content of antimony is 24.2%.

*Example 7.—Antimony trilaurate*

Antimony trioxide may be reacted with acetic lauric anhydride formed in situ by adding 364 parts of antimony trioxide, 384 parts of acetic anhydride, and 1502 parts of lauric acid, to a reaction vessel fitted with agitation and a reflux condenser. The reaction mixture may be heated to reflux temperature at which it may be maintained for 120 minutes.

The reaction mixture may then be subjected to a pressure of 10 to 20 mm. Hg and the by-product acetic acid may be recovered by distilling to a pot temperature of 175° C.

At the end of the distillation, the solid residue found on cooling may be dissolved in 5000 parts of benzene and passed through a bed of diatomaceous earth to prepare a bright, sparkling solution. The benzene may be recovered by distillation to give a solid product, 1710 parts (representing a 95% yield) with an antimony content of 16.7%. Theoretical content of antimony is 16.9%.

*Example 8.—Antimony tritetrachlorobenzoate*

Antimony oxide may be reacted with acetic benzoic acid formed in situ by adding 364 parts of antimony trioxide, 384 parts of acetic anhydride, and 2001 parts of tetrachlorobenzoic acid to a reaction vessel fitted with agitation and a reflux condenser. The reaction mixture may be heated to reflux temperature at which it may be maintained for 150 minutes.

The reaction mixture may then be subjected to a pressure of 10 to 20 mm. Hg and the by-product acetic acid may be recovered by distilling for 30 minutes to a pot temperature of 150° C.

At the end of the distillation, the solid residue found on cooling may be dissolved in 5000 parts of benzene and passed through a bed of diatomaceous earth to prepare a bright, sparkling product. The benzene may be recovered by distillation to give a solid product, 2120 parts (representing a 92% yield) with an antimony content of 12.5%. Theoretical content of antimony is 13.2%.

*Example 9.—Stannous oleate*

Stannous oxide may be reacted with acetic oleic anhydride formed in situ by adding 1198 parts of stannous oxide, 908 parts of acetic anhydride, and 5000 parts of U.S.P. oleic acid to a reaction vessel fitted with agitation and a reflux condenser. The reaction mixture may be heated to reflux temperature at which it may be maintained for 210 minutes.

The reaction mixture may then be subjected to a pressure of 10 to 20 mm. Hg and the by-product acetic acid may be recovered by distilling for 15 minutes to a pot temperature of 150° C.

At the end of the distillation, the solid residue found on cooling may be dissolved in 5000 parts of benzene and passed through a bed of diatomaceous earth to prepare a bright, sparkling solution. The benzene may be recovered by distillation to give a solid product, 5400 parts (representing a 90% yield) with a tin content of 17.0%. Theoretical content of tin is 17.0%.

*Example 10.—Antimony triphenoxyacetate*

Antimony trioxide may be reacted with acetic phenoxyacetic anhydride formed in situ by adding 272 parts of antimony trioxide, 292 parts of acetic anhydride, and 870 parts of phenoxyacetic acid to a reaction vessel fitted with agitation and a reflux condenser. The reaction mixture may be heated to reflux temperature at which it may be maintained for 120 minutes.

The reaction mixture may then be subjected to a pressure of 10 to 20 mm. Hg and the by-product acetic acid may be recovered by distilling for 15 minutes to a pot temperature of 150° C.

At the end of the distillation, the solid residue found on cooling may be dissolved in 1000 parts of benzene and passed through a bed of diatomaceous earth to prepare a bright, sparkling solution. The benzene may be recovered by distillation to give a solid product, 973 parts (representing a 91% yield) with an antimony content of 20.7%. Theoretical content of antimony is 21.2%.

*Example 11.—Stannous 2-ethylhexoate*

Stannous oxide may be reacted with acetic 2-ethylhexoic anhydride formed in situ by adding 2330 parts of the metal oxide, stannous oxide, 1765 parts of acetic anhydride, and 5000 parts of 2-ethylhexoic acid to a reaction vessel fitted with agitation and a reflux condenser. The reaction mixture may be heated to reflux temperature at which it may be maintained for 210 minutes.

The reaction mixture may then be subjected to a pressure of 10 to 20 mm. Hg and the by-product acetic acid may be recovered by distilling to a pot temperature of 150° C.

At the end of the distillation, the residue may be passed through a bed of diatomaceous earth to prepare a bright, sparkling product, with a tin content of 29.3%. Theoretical content of tin is 28.3%.

*Example 12.—Antimony tris-2-ethylhexoate*

Antimony trioxide may be reacted with acetic 2-ethylhexoic anhydride formed in situ by adding 583 parts of antimony trioxide, 613 parts of acetic anhydride, and 1930 parts of 2-ethylhexoic acid to a reaction vessel fitted with agitation and a reflux condenser. The reaction mixture may be heated to reflux temperature at which it may be maintained for 60 minutes.

The reaction mixture may then be subjected to a pressure of 10 to 20 mm. Hg and the by-product acetic acid may be recovered by distilling for 15 minutes to a pot temperature of 100° C. for 30 minutes and then raising the temperature to 150° C.

At the end of the distillation, the residue may be passed through a bed of diatomaceous earth to produce a bright, sparkling solution. The product, 2006 parts (representing 91% yield) upon analysis may be found to have an antimony content of 20.8%. Theoretical content of antimony is 22.1%.

If desired, the product may be further purified by molecular distillation. A distilled product may be found to have an antimony content of 22.2%.

*Example 13.—Antimony tristearate*

Antimony trioxide may be reacted with acetic stearic anhydride formed in situ by adding 146 parts of antimony trioxide, 153 parts of acetic anhydride, and 854 parts of stearic acid to a reaction vessel fitted with agitation and a reflux condenser. The reaction mixture may be heated to reflux temperature at which it may be maintained for 120 minutes.

The reaction mixture may then be subjected to a pressure of 10 to 20 mm. Hg and the by product acetic acid may be recovered by distilling for 30 minutes to a pot temperature of 150° C.

At the end of the distillation, the solid residue found on cooling may be dissolved in 1000 parts of cyclohexane and passed through a bed of diatomaceous earth to prepare a bright, sparkling solution. On recrystallization, 870 parts (representing 90% yield) of product were obtained having an antimony content of 13.4%. Theoretical content of antimony is 12.5%. The product melted at 80° C.–83° C.

*Example 14.—Antimony tritallate*

2040 parts of the mixed anhydride from propionic acid and the acids of tall oil may be prepared by refluxing propionic anhydride, 780 parts, and tall oil fatty acids (having an acid number of 199) 1704 parts, and distilling off 444 parts of propionic acid as it is formed. The 2040 parts of the mixed anhydride, so prepared, and 292 parts of the metal oxide, antimony trioxide, may be added to a reaction vessel fitted with agitation and a reflux condenser. The reaction mixture may be heated to reflux temperature at which it is maintained for 90 minutes. The reaction mixture may then be subjected to a pressure of 4 mm. Hg and the by-product propionic anhydride may be recovered by distilling for 30 minutes to a pot temperature of 150° C.

At the end of the distillation, the residue may be passed through a bed of diatomaceous earth to prepare a bright, sparkling product. The product, 1710 parts (representing a 88% yield) may be found to have an antimony content of 12.3%. Theoretical content of antimony is 12.6%.

It is a particular feature of this invention that the use of mixed carboxylic acid anhydrides in accordance with this invention permits ready economic manufacture of metal salts in high purity and yield from readily available raw materials. Use of the mixed anhydrides as herein defined, rather than of a symmetrical anhydride of a higher acid permits attainment of the desired product at moderate-to-low temperatures in short periods of time. It is not readily possible to obtain the desired products by the use of the symmetrical anhydrides of higher acids.

Use of the process of this invention permits attainment, particularly in the case of the Group VA metals, of products which cannot be readily made economically by prior art processes which are typically characterized by long reaction times and by use of materials which are difficult to prepare and to work with.

The metal salts prepared by the process of this invention may be employed as flame retardants in various compositions including polyvinyl chloride, polyester, etc. resins where they are particularly satisfactory because of their clarity and transparency; fungicides; stabilizers in various compositions including polyvinyl chloride resins; catalysts; catalyst promoters for free-radical polymerization; etc.

The products which may be made by practice of this invention may be employed e.g. as flame retardants. A specific example of the use of these materials may be as follows, showing the use of antimony tris-2-ethylhexoate, other materials, e.g. antimony tristearate, etc. being useful in similar manner for this illustrative use as well as for the other herein disclosed uses.

*Example 15.—(Flexible)*

Polyvinyl chloride resin mixes were prepared from 100 parts of Geon 101–EP (a polyvinyl chloride resin base); 50 parts of commercial dioctyl phthalate plasticizer; 2 parts of dibutyltin S,S'-bis isooctylmercaptoacetate stabilizer; and 0.25 part of stearic acid.

A control sample of the above mix was set aside. An experimental sample was prepared by adding to a separate batch of the above mix 5 parts of antimony tris-2-ethylhexoate. The control and the experimental samples were each separately milled to form 25 mil clear transparent films. Each of these films was tested according to ASTM Test D1433–58 to determine flame resistance.

The control sample burned completely. The experimental formulation was found to be self-extinguishing and exhibited a char length of about 2 inches.

From this, it may be concluded that antimony tris-2-ethylhexoate is a flame retardant.

While the invention has been described with reference to specific embodiments, it will be apparent to those skilled in the art that various changes and modifications may be made thereto.

I claim:

1. A process for preparing a salt of a metal selected from the group consisting of Groups IVA and VA of the Periodic Table which comprises reacting an oxide of said metal with a mixed carboxylic acid anhydride of a lower molecular weight monocarboxylic acid and a higher molecular weight monocarboxylic acid thereby forming a metal salt containing the said higher molecular weight monocarboxylic acid and a by-product selected from the group consisting of acids and anhydrides containing said lower molecular weight monocarboxylic acid and recovering said salt.

2. A process as claimed in claim 1 wherein said mixed carboxylic acid anhydride is formed prior to the reaction with said metal oxide.

3. A process as claimed in claim 1 wherein said mixed carboxylic acid anhydride is formed in situ.

4. A process as claimed in claim 1 wherein the higher molecular weight monocarboxylic acid of said mixed carboxylic acid anhydride contains 7–22 carbon atoms.

5. A process as claimed in claim 1 wherein the lower molecular weight monocarboxylic acid of said mixed carboxylic acid anhydride contains less than 4 carbon atoms.

6. A process as claimed in claim 1 wherein the higher molecular weight monocarboxylic acid of said mixed carboxylic acid anhydride contains 7–22 carbon atoms and the lower molecular weight monocarboxylic acid of said mixed carboxylic acid anhydride contains less than 4 carbon atoms.

7. A process for preparing a salt of a metal selected from the group consisting of Groups IVA and VA of the Periodic Table which comprises reacting an oxide of said metal with a lower molecular weight monocarboxylic acid anhydride and a higher molecular weight monocarboxylic acid thereby forming a metal salt containing said higher molecular weight monocarboxylic acid and a by-product lower molecular weight monocarboxylic acid, and recovering said salt.

8. A process as claimed in claim 7 wherein said by-product lower molecular weight monocarboxylic acid is distilled off from said salt.

9. A process as claimed in claim 8 wherein said reaction is conducted at reflux temperature.

10. A process for preparing a salt of a metal selected from the group consisting of Groups IVA and VA of the Periodic Table which comprises reacting an oxide of said metal with a ketene selected from the group consisting of ketene and ketenes having a lower molecular weight hydrocarbon radical and with a higher molecular weight monocarboxylic acid thereby forming a metal salt containing the said higher molecular weight monocarboxylic acid and a by-product carboxylic acid anhydride containing said lower molecular weight hydrocarbon radical and recovering said salt.

11. A process as claimed in claim 9 wherein said by-product carboxylic acid anhydride containing said lower molecular weight hydrocarbon radical is distilled off from said salt.

12. A process for preparing a salt of a metal selected from the group consisting of Groups IVA–VA of the Periodic Table and an organic monocarboxylic acid which comprises reacting an oxide of said metal with said acid in the presence of a ketene, thereby forming said metal salt and, as a by-product, an anhydride of a carboxylic acid; and distilling said anhydride from said metal salt.

13. A process for preparing antimony tristearate which comprises reacting antimony oxide with acetic anhydride and stearic acid thereby forming antimony tristearate and by-product acetic acid, distilling said acetic acid from said antimony tristearate and recovering said antimony tristearate.

14. A process for preparing a salt of a metal selected from the group consisting of Groups IVA and VA of the Periodic Table which comprises reacting a metal oxide with a mixed carboxylic acid anhydride in accordance with the equation

$$M_2O_a + 2aR'COOCOR \rightarrow 2M(COOR')_a + a(RCO)_2O$$

wherein M is a metal of Groups IVA and VA of the Periodic Table, R is a lower molecular weight hydrocarbon radical, R' is a higher molecular weight hydrocarbon radical, and $a$ is 2 when the metal M is a Group IVA metal, and 3 when the metal M is a Group VA metal.

15. A process for producing antimony tritallate which comprises reacting antimony oxide with the mixed carboxylic acid anhydride of tall oil fatty acid and a lower molecular weight hydrocarbon monocarboxylic acid.

16. A process for producing a salt of arsenic which comprises reacting an arsenic oxide with a lower molecular weight monocarboxylic acid R'COOH and an acid anhydride $(RCO)_2O$ of a higher molecular weight monocarboxylic acid, the relationship between R and R' being such that the acid R'COOH is less volatile than the acid RCOOH thereby forming a metal salt of the acid R'COOH and as a by-product, the acid RCOOH; distilling said by-product RCOOH from said metal salt; and recovering said metal salt.

17. A process for producing a salt of antimony which comprises reacting an antimony oxide with a molecular weight monocarboxylic acid R'COOH and an acid anhydride $(RCO)_2O$ of a higher molecular weight monocarboxylic acid, the relationship between R and R' being such that the acid R'COOH is less volatile than the acid RCOOH thereby forming a metal salt of the acid R'COOH and as a by-product, the acid RCOOH; distilling said by-product RCOOH from said metal salt; and recovering said metal salt.

18. A process for producing a salt of bismuth which comprises reacting a bismuth oxide with a molecular weight monocarboxylic acid R'COOH and an acid anhydride $(RCO)_2O$ of a higher molecular weight monocarboxylic acid, the relationship between R and R' being such that the acid R'COOH is less volatile than the acid RCOOH thereby forming a metal salt of the acid R'COOH and as a by-product, the acid RCOOH; distilling said by-product RCOOH from said metal salt; and recovering said metal salt.

19. A process for producing a salt of germanium which comprises reacting a germanium oxide with a lower molecular weight monocarboxylic acid R'COOH and an acid anhydride $(RCO)_2O$ of a higher molecular weight monocarboxylic acid, the relationship between R and R' being such that the acid R'COOH is less volatile than the acid RCOOH thereby forming a metal salt of the acid R'COOH and as a by-product, the acid RCOOH; distilling said by-product RCOOH from said metal salt; and recovering said metal salt.

20. A process for producing a salt of tin which comprises reacting a tin oxide with a lower molecular weight monocarboxylic acid R'COOH and an acid anhydride $(RCO)_2O$ of a higher molecular weight monocarboxylic acid, the relationship between R and R' being such that the acid R'COOH is less volatile than the acid RCOOH thereby forming a metal salt of the acid R'COOH and as a by-product, the acid RCOOH; distilling said by-product RCOOH from said metal salt; and recovering said metal salt.

21. A process for producing a salt of lead which comprises reacting a lead oxide with a lower molecular weight monocarboxylic acid R'COOH and an acid anhydride $(RCO)_2O$ of a higher molecular weight monocarboxylic acid, the relationship between R and R' being such that the acid R'COOH is less volatile than the acid RCOOH thereby forming a metal salt of the acid R'COOH and as a by-product, the acid RCOOH; distilling said by-product RCOOH from said metal salt; and recovering said metal salt.

22. Antimony tritallate, being the antimony salt of tall oil fatty acid.

References Cited by the Examiner

UNITED STATES PATENTS

| | | | |
|---|---|---|---|
| 2,044,968 | 6/36 | Bruson | 260—446 |
| 2,090,201 | 8/37 | Hermann et al. | 260—447 |
| 2,229,992 | 1/41 | Schmidt | 260—446 |
| 2,480,823 | 9/49 | Morris et al. | 260—446 |
| 2,584,041 | 1/52 | Nowak et al. | 260—414 |

OTHER REFERENCES

Chemical Abstracts, volume 37, 621[2], 1943.
Chemical Abstracts, volume 42, 5051d, 1948.

CHARLES B. PARKER, *Primary Examiner.*

L. E. LEVOW, ABRAHAM H. WINKELSTEIN, IRVING MARCUS, *Examiners.*